(12) United States Patent
Tate et al.

(10) Patent No.: US 12,263,419 B2
(45) Date of Patent: Apr. 1, 2025

(54) FILTER ELEMENT AND ASSOCIATED FILTER MEDIA PROVIDING FUEL WATER SEPARATION USING SURFACE EMBOSSING

(71) Applicant: Parker-Hannifin Corporation, Cleveland, OH (US)

(72) Inventors: Jason L. Tate, Thompsons Station, TN (US); Sreevalli Bokka, Akron, OH (US); Swarna Agarwal, Modesto, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 447 days.

(21) Appl. No.: 17/678,522

(22) Filed: Feb. 23, 2022

(65) Prior Publication Data

US 2022/0203265 A1    Jun. 30, 2022

Related U.S. Application Data

(63) Continuation of application No. PCT/US2020/047394, filed on Aug. 21, 2020.
(Continued)

(51) Int. Cl.
  *B01D 17/04*    (2006.01)
  *B01D 17/00*    (2006.01)
  (Continued)

(52) U.S. Cl.
  CPC .......... *B01D 17/045* (2013.01); *B01D 17/10* (2013.01); *B01D 29/333* (2013.01); *B01D 46/001* (2013.01); *B01D 46/521* (2013.01)

(58) Field of Classification Search
  CPC .... B01D 17/045; B01D 17/10; B01D 29/111; B01D 2201/127; B01D 29/21; B01D 2239/0428; B01D 2239/065; B01D 2239/069; B01D 29/012; B01D 29/07; B01D 29/232; B01D 29/333; B01D 29/353; B01D 46/001; B01D 46/52; B01D 46/521; B01D 46/522; B01D 46/523; B01D 46/525; B01D 33/0191; B01D 33/0384; B01D 2201/12; B01D 2201/122; B01D 2201/125
  (Continued)

(56) References Cited

U.S. PATENT DOCUMENTS 3,198,336 A    8/1965  Hyslop
3,531,920 A *  10/1970 Hart .................. F24F 13/28
                                                55/497
(Continued)

FOREIGN PATENT DOCUMENTS

EP    0784503 B1    4/2001
JP    H06142406 A   5/1994
(Continued)

*Primary Examiner* — Joseph W Drodge
(74) *Attorney, Agent, or Firm* — Reinhart Boerner Van Deuren P.C.

(57) ABSTRACT

A filter media, filter element, filter system and methods are provided. The filter media provides improved filter characteristics including water separation efficiency. The filter media may include one or more of increased surface roughness and/or embossments. The filter media may be provided by pleated filter media.

43 Claims, 12 Drawing Sheets

Related U.S. Application Data

(60) Provisional application No. 62/989,409, filed on Mar. 13, 2020, provisional application No. 62/891,452, filed on Aug. 26, 2019.

(51) Int. Cl.
*B01D 29/33* (2006.01)
*B01D 46/00* (2022.01)
*B01D 46/52* (2006.01)

(58) Field of Classification Search
USPC .............................. 210/493.1, 493.5; 55/521
See application file for complete search history.

(56) References Cited

U.S. PATENT DOCUMENTS

| | | | |
|---|---|---|---|
| 4,452,619 A * | 6/1984 | Wright | B01D 46/523 |
| | | | 55/498 |
| 5,030,263 A | 7/1991 | Kemp | |
| 5,858,044 A * | 1/1999 | Nepsund | F02M 35/024 |
| | | | 55/486 |
| 7,081,291 B2 | 7/2006 | Courtoy et al. | |
| 7,425,227 B1 | 9/2008 | Hutchison et al. | |
| 10,010,892 B2 | 7/2018 | Koike et al. | |
| 11,235,270 B2 * | 2/2022 | Tate | B01D 46/523 |
| 2003/0010002 A1 * | 1/2003 | Johnson | B01D 39/1623 |
| | | | 55/486 |
| 2012/0177888 A1 | 7/2012 | Escafere et al. | |
| 2012/0261331 A1 | 10/2012 | Ter Horst et al. | |
| 2014/0275692 A1 | 9/2014 | Patel et al. | |
| 2015/0328565 A1 | 11/2015 | Swaminathan et al. | |
| 2016/0016106 A1 | 1/2016 | Bowerman et al. | |
| 2016/0236132 A1 * | 8/2016 | Hara | B01D 46/0001 |
| 2017/0043548 A1 | 2/2017 | Boivin et al. | |
| 2018/0200645 A1 | 7/2018 | Krasinski et al. | |
| 2018/0214806 A1 * | 8/2018 | Tate | B01D 46/0001 |
| 2019/0105593 A1 * | 4/2019 | Krull | B01D 46/52 |
| 2019/0282930 A1 * | 9/2019 | Wieczorek | B01D 17/04 |
| 2019/0366252 A1 | 12/2019 | Tate et al. | |
| 2022/0176277 A1 * | 6/2022 | Tate | B01D 36/006 |

FOREIGN PATENT DOCUMENTS

| | | |
|---|---|---|
| JP | 4503897 B2 | 4/2010 |
| WO | WO 2001/02093 A2 | 1/2001 |
| WO | WO 2014/173709 A1 | 10/2014 |

* cited by examiner

12,263,419 B2

FILTER ELEMENT AND ASSOCIATED FILTER MEDIA PROVIDING FUEL WATER SEPARATION USING SURFACE EMBOSSING

CROSS-REFERENCE TO RELATED PATENT APPLICATIONS

This patent application is a continuation of U.S. PCT Application No.: PCT/US2020/047394, filed Aug. 21, 2020, which claims the benefit of U.S. Provisional Patent Application No. 62/989,409, filed Mar. 13, 2020, and claims the benefit of U.S. Provisional Patent Application No. 62/891,452, filed Aug. 26, 2019, the entire teachings and disclosure of which are incorporated herein by reference thereto.

FIELD OF THE INVENTION

This invention generally relates to filtration, and more specifically to coalescing filtration systems used for example in hydrocarbon fuel systems and applications.

BACKGROUND OF THE INVENTION

Coalescing filtration systems are often employed as the first stage in filter/separator vessels for hydrocarbon fluids e.g. fuels. Such systems filter out particulate contaminants and coalesce (combine) highly dispersed, emulsified water particles into larger water drops. These larger water drops are then collected and removed from the system.

A variety of methodologies may be employed to achieve such coalescence. For example, small droplets of water entrained in the fuel can contact and adhere to strands of filter media (for example, fiberglass). The operating pressure in the system and fluid flow pushes the droplets along these strands until they reach an intersection of strands where they combine with other droplets, and hence coalesce, into large drops.

These large drops are then carried to the outside surface of the cartridge in a conventional inside-out flow arrangement, although outside-in flow arrangements are also possible. Having a higher specific gravity than the fuel, the water droplets release and settle to a collection region at the bottom of the vessel containing the filter media. This collection region can then be evacuated from time to time.

Many applications find the above exemplary coalescence process desirable. The largest single application of a fuel coalescer is the filtration of aviation jet fuel, however they are also used with other types of fuels, process streams in refineries and petrochemical plants, and condensate streams where natural gas is produced. Other liquids can be separated if they are immiscible, the specific gravities differ, and high concentrations of surface active agents are not present.

While the above systems have been found satisfactory, there remains room for improvement. Indeed, there is a constant desire to reduce the pressure drop across a filter element, with such pressure drop typically being driven by the filtration media used in the filter element. There is thus a need in the art for a filtration element and associated filtration media that exhibits a reduced pressure differential while still providing the advantages of fuel water separation, i.e. water coalescence.

BRIEF SUMMARY OF THE INVENTION

The present application provides such a filter element and associated filter media as well as methods of forming the same. The present application provides improvements over the current state of the art.

In one embodiment, a method of making filter media is provided. The method includes providing a layer of filtration media having a surface with a predetermined roughness. The method includes contacting the surface of the media with a device having a selected roughness to impart a greater roughness to the surface of the media than the predetermined roughness.

The device may be a roller a plate, a belt or other structure for imparting enhanced surface roughness. The device may also include structure for forming structural embossments.

In one embodiment, the method includes the step of compressing the media with the device. This can form the enhanced surface roughness or the structural embossments.

In one embodiment, the method includes the step of pleating the media after the media is contacted with the device.

In one embodiment, the method includes the step of forming structural embossments in the surface of the media layer.

In one embodiment, the step of pleating the media includes forming fold lines between adjacent pleat panels. The method includes forming a plurality of the structural embossments that are elongated such that each of the plurality of the structural embossments has a first end and a second defining an embossment axis extending between the first end and the second end. The embossment axis extends at a non-parallel and non-perpendicular orientation relative to the fold lines.

In one embodiment, a first structural embossment and a second structural embossment of the plurality of structural embossments are formed in a first pleat panel. The embossment axis of the first structural embossment extends at a different angle than the embossment axis of the second structural embossment relative to the fold line.

In one embodiment, the filter element has a gravitational top and a gravitational bottom. The gravitational top is vertically above the gravitational bottom. The embossment axis of the first structural embossment is less aligned with gravity than the embossment axis of the second structural embossment.

In one embodiment, a third structural embossment of the plurality of structural embossments is formed in a second pleat panel. The fold line is formed between the first and second pleat panels. The first end of the third structural embossment is positioned axially between the first ends of the first and second structural embossments along the fold line and the first end of the second structural embossment is positioned axially between the first and second ends of the third structural embossment.

In one embodiment, the plurality of structural embossments each have a width that is generally perpendicular to the embossment axis. The width increases when moving from the first end toward the second end. In some embodiments, this will be in a radially inward direction when the filter media is formed into a tube of pleated filter media. In other embodiments, this may simply be in a generally downstream direction e.g. from an upstream face to a downstream face of the filter media pack, such as in a panel filter element.

In one embodiment, the first and second structural embossments form a projection on a first side of the layer of filter media and a depression on the second side of the filter media. The third structural embossment forms a projection on the second side of the filter media and a recess on the first side of the filter media.

In one embodiment, the step of contacting the surface of the media with a device having a selected roughness to impart a greater roughness to the surface of the media than the predetermined roughness occurs on at least 80% and more preferably at least 90% of the filter media that does not include structural embossments.

In one embodiment, at least 95% of the surface of the filter media has been manipulated to include at least one of an increased surface roughness, a fold line and/or a structural embossment.

In one embodiment, the roller or plate has a surface roughness of at least 35μ and more preferably at least 190μ.

In one embodiment, the enhance surface roughness of the filter media is 20μ and more preferably at least 100μ.

In one embodiment, the step of contacting the surface of the media with a device having a selected roughness to impart a greater roughness to the surface of the media than the predetermined roughness is performed without removing material of the filter media.

In one embodiment, the step of contacting the surface of the media with a device having a selected roughness to impart a greater roughness to the surface of the media than the predetermined roughness is performed by compacting the filter media to form the greater roughness.

In one embodiment, the surface of the layer of filter media is an upstream surface of the layer of filter media that is an exposed surface.

In one embodiment, the layer of filter media is a pre-laminated media formed from a plurality of media layers. The step of contacting the surface of the media with a device having a selected roughness to impart a greater roughness to the surface of the media than the predetermined roughness does not simultaneously secure the plurality of media layers to form the layer of filter media.

In a particular implementation, the filter media is unwound from a roll of filter media in the laminated state prior to performing any surface roughness enhancement processes.

In one embodiment, the surface is not subsequently coated or covered after the step of contacting the surface of the media with a device having a selected roughness to impart a greater roughness to the surface of the media than the predetermined roughness.

In one embodiment, the surface roughness of the filter media layer has a contact angle measured using a Goniometer using water of between 130 degrees and 140 degrees and preferably at least 132 degrees.

In one embodiment, a filter element is provided. The filter element includes a pleated filter media pack formed from a layer of filtration media. The layer of filtration media forms a plurality of pleat panels formed by a plurality of fold lines. The filtration media has an upstream surface and a downstream surface. The upstream surface is compressed to have a desired surface roughness.

In one embodiment, the surface roughness of the upstream surface is greater than the surface roughness of the downstream surface.

In one embodiment, the upstream surface of the layer of filtration media is exposed such that fluid to be filtered first contacts the upstream surface of the layer of filtration media. As such, the surface that provides the desired roughness is not located between different layers of filter media. Further, the crevices or voids that form the surface roughness are not filled with other material.

In one embodiment, the layer of filtration media includes structural embossments in the upstream surface of the media layer.

In one embodiment, a plurality of the structural embossments are elongated such that each of the plurality of the structural embossments has a first end and a second defining an embossment axis extending between the first end and the second end. The embossment axis extends at a non-parallel and non-perpendicular orientation relative to the fold lines.

In one embodiment, a first structural embossment and a second structural embossment of the plurality of structural embossments are formed in a first pleat panel. The embossment axis of the first structural embossment extending at a different angle than the embossment axis of the second structural embossment relative to the fold line.

In one embodiment, the filter element has a gravitational top and a gravitational bottom, the gravitational top being vertically above the gravitational bottom. The embossment axis of the first structural embossment is less aligned with gravity than the embossment axis of the second structural embossment. The first structural embossment being vertically above the second structural embossment.

In one embodiment, a third structural embossment of the plurality of structural embossments is formed in a second pleat panel. The fold line is formed between the first and second pleat panels. The first end of the third structural embossment is positioned axially between the first ends of the first and second structural embossments along the fold line and the first end of the second structural embossment is positioned axially between the first and second ends of the third structural embossment.

In one embodiment, the first, second and third embossments are positioned between upstream fold lines and downstream fold lines (e.g. radially outer fold lines and radially inner fold lines in a cylindrical element).

In one embodiment, the first, second and third embossments are positioned at a same location between the upstream and downstream fold lines.

In one embodiment, the first, second, and third embossments are axially offset from one another along the fold lines.

In one embodiment, the plurality of structural embossments each have a width that is generally perpendicular to the embossment axis. The width increasing when moving from the first end toward the second end. In one particular embodiment, this increase in width occurs when moving towards the downstream fold lines (e.g. radially inward in a cylindrical filter element or through the media pack when moving from an upstream face towards a downstream face of a panel filter element).

In one embodiment, the first and second structural embossments form a projection on a first side of the layer of filter media and a depression on the second side of the filter media. The third structural embossment forms a projection on the second side of the filter media and a recess on the first side of the filter media.

In one embodiment, at least 80% and more preferably at least 90% of the filter media that does not include structural embossments has a surface roughness that is greater than the surface roughness of the structural embossments.

In one embodiment, at least 95% of the surface of the filter media has been manipulated to include at least one of an increased surface roughness, a fold line and/or a structural embossment.

In one embodiment, the surface roughness of the upstream surface is at least 116μ which is equivalent to that of 120 grit sand paper and more preferably at least 190μ, which is equivalent to that of 80 grit sand paper and even more preferably at least 425μ, which is equivalent to 40 grit sand paper.

In one embodiment, the surface roughness of the upstream surface is at least equivalent to that of 120 grit sand paper and more preferably at least equivalent to that of 80 grit sand paper and even more preferably at least equivalent to 40 grit sand paper.

In one embodiment, the surface roughness of the upstream surface has been manipulated to be at least 50% greater than in an unmanipulated state, more preferably at least 100% greater than in an unmanipulated state, and even more preferably at least 400% greater than in an unmanipulated state.

In one embodiment, the surface roughness of the upstream face of the layer of filter media has been provided by compressing the upstream face of the layer of filtration media and not by removal of material from the upstream face.

In one embodiment, the upstream surface of the layer of filtration media is an exposed surface and the voids in the upstream surface forming the surface roughness are not filled with or covered by other material. This does not include potential overlap of adjacent pleat panels once the filter media is folded about the pleat folds.

In one embodiment, the layer of filtration media is a pre-laminated media formed from a plurality of media layers secured to one another independent of the structures of the filtration media providing the surface roughness of the upstream face.

In one embodiment, the surface roughness of the filtration media layer has a contact angle measured using a goniometer using water of between 130 degrees and 140 degrees and preferably at least 132 degrees.

In an embodiment, a method of filtering water from a flow of fuel includes passing the flow of fuel through the filtration media of a filter element according to any one of the embodiments outlined above as the fuel flows from an inlet of the filter element to an outlet of the filter element.

In an embodiment, a filtration system including a filter head having an inlet and an outlet; a housing, the housing defining a sump region; and a filter element according to any one of the prior embodiments is provided. The filter element is positioned within the housing vertically above, at least in part, the sump region and fluidly interposed between the inlet and outlet.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
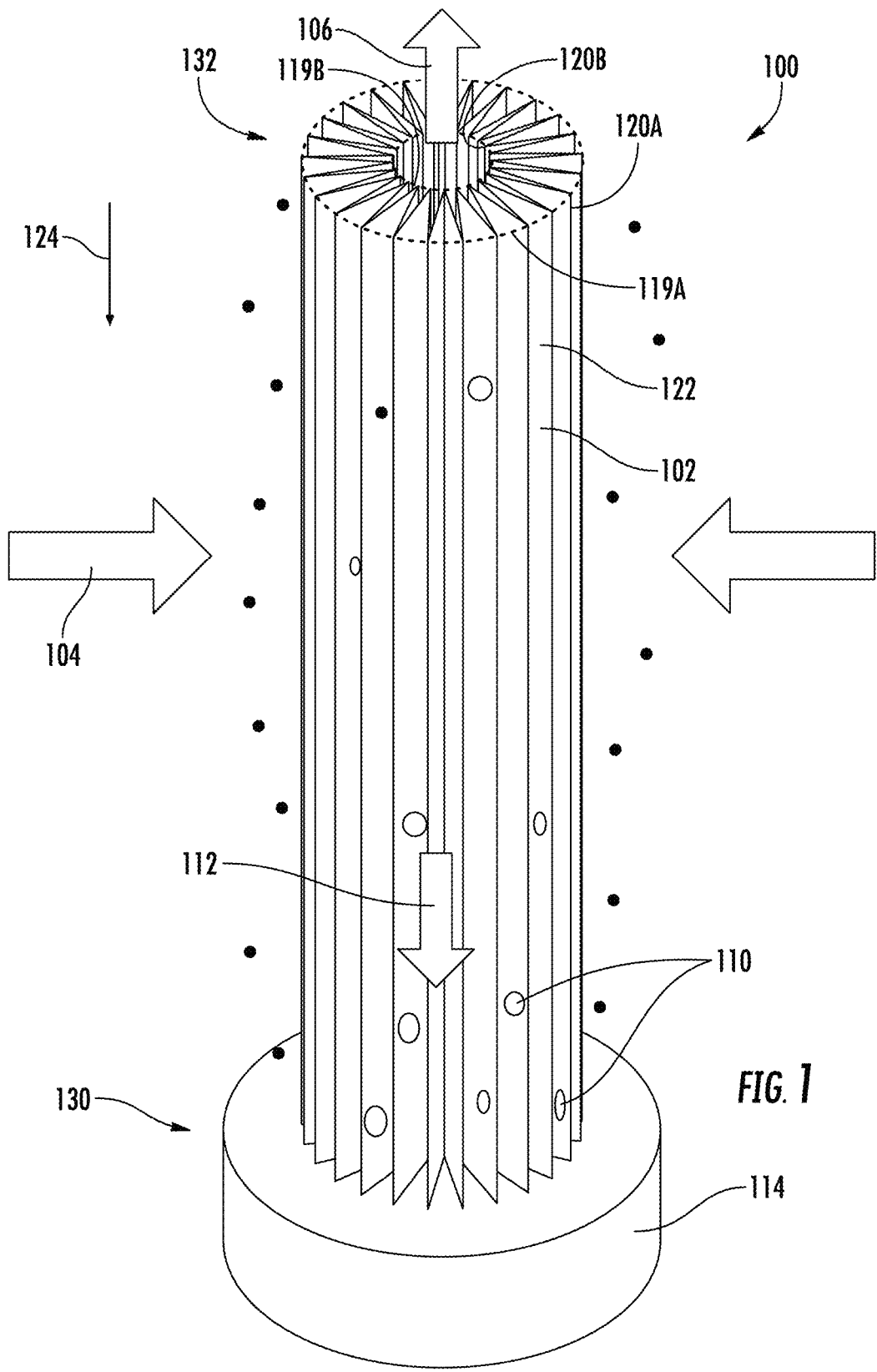
FIG. 1 is a simplified illustration of a filter element.

FIG. 1 illustrates a simplified filter element 100 incorporating the teachings of the present application. The filter element 100 includes pleated filter media 102 (also referred to as "filtration media") that is formed into a cylindrical tube. While this embodiment illustrates the pleated filter media 102 in the cylindrical tube, other embodiments according to the present teachings could utilized a flat panel of filter media.

Filter element 100 finds particular benefit in filtering water from a flow fluid, such as a flow of fuel. The filter element 100 may also filter particulate matter from the flow fluid.

Dirty fluid enters the filter element 100 through one or more inlets, illustrated by arrows 104. The dirty fluid flows through the filter media 102 from an upstream side to a downstream side. After passing though the filter media 102, the cleaned fluid flows through one or more outlets, illustrated by arrow 106.

The filter media 102 is preferably configured to coalesce entrained water within the unfiltered fluid such that coalesced water droplets 110 will be separated from the fluid. The coalesced water droplets 110 will flow, illustrated by arrow 112 to a water sump 114 or other collection area.

Figure 13:
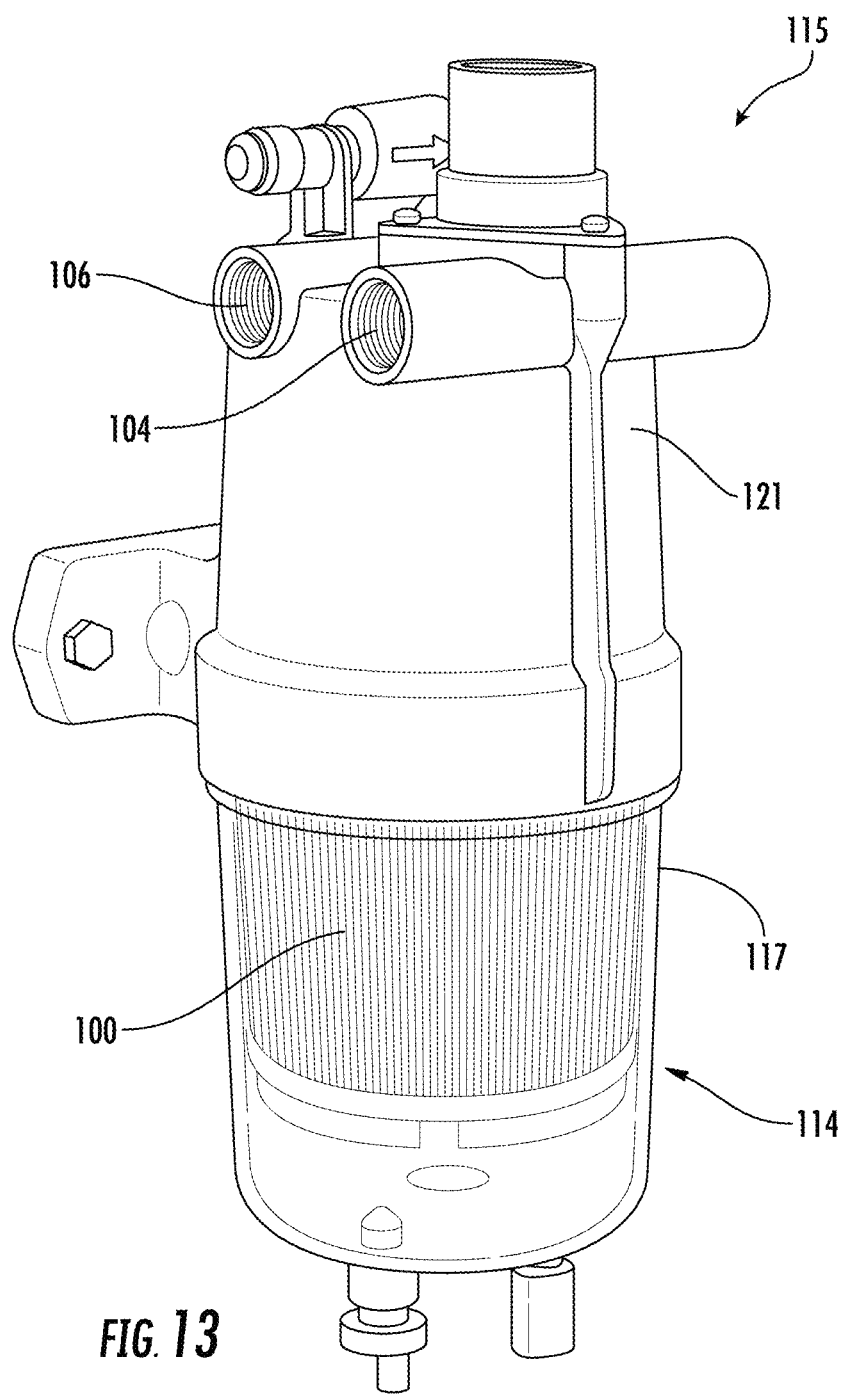
FIG. 13 is an illustration of a filtration system in which the filter element of FIG. 1 may be used.

FIG. 13 illustrates a filtration system 115 in which the filter element 100 can have particular applicability. Here, the sump 114 is provided by a removable bowl 117 that is removably connected to a filter head 121. The filter head 121 provides the inlet 104 and outlet 106.

The filter media 102 is a pleated layer of filter media having a plurality of folds 120 that define fold lines that separate adjacent pleat panels 122. In a preferred embodiment, the folds 120 are generally parallel to gravity, illustrated by arrow 124 in FIG. 1. Preferably, the water sump 114 is at a bottom end 130 of the filter media 102 while the outlet 106 as top end 132 where "top" and "bottom" are defined with reference to gravity. In this way, gravity can be used to cause the coalesced water droplets 110 flow toward the water sump 114 rather than outlet 106.

As noted, the filter media 102 is preferably formed from pleated media with a plurality of pleat panels 122 separated by pleat folds 120.

Figure 2:
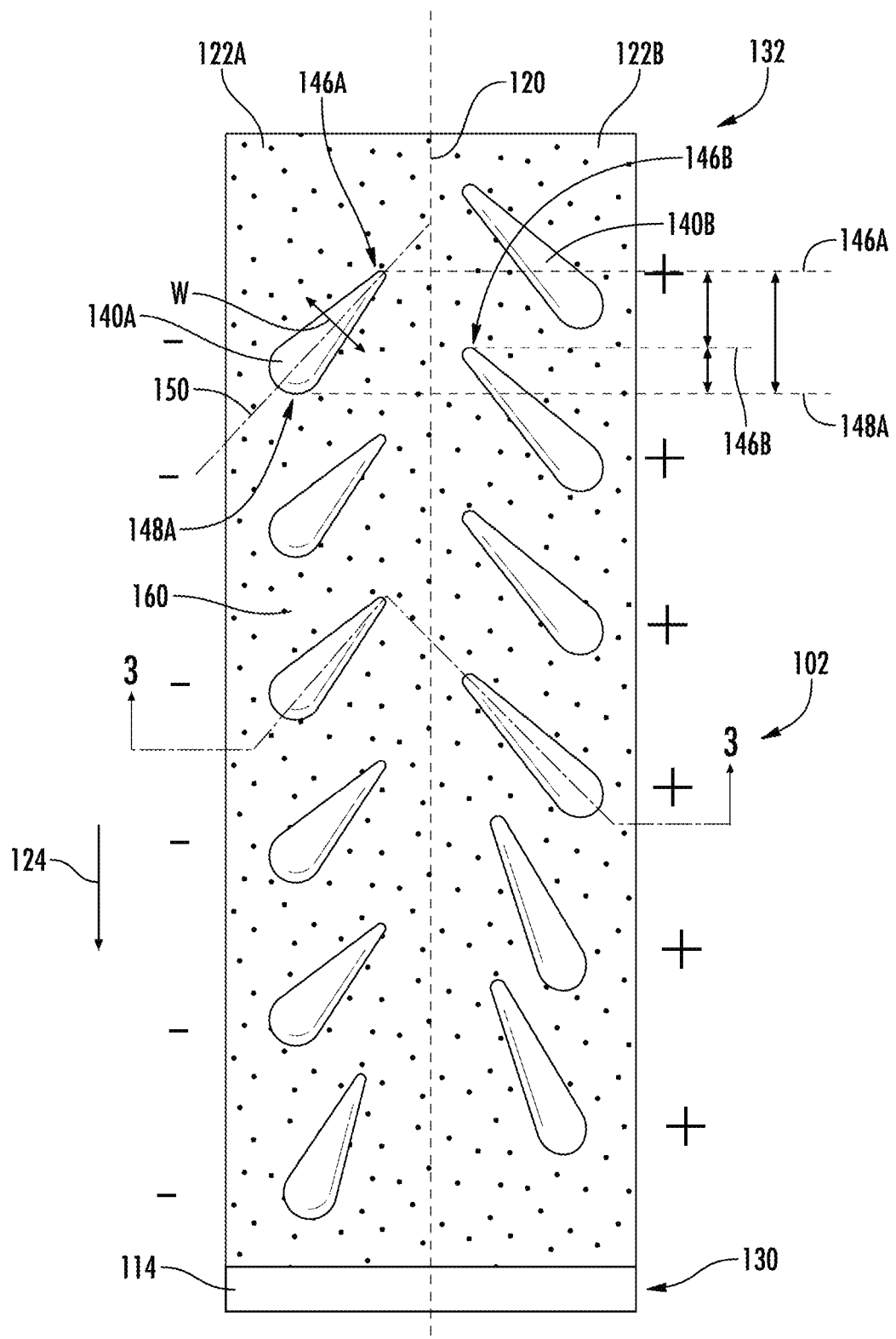
FIG. 2 is a simplified illustration of a pair of pleat panels used in the filter media of the filter element of FIG. 1.

FIG. 2 is a top view of a pair of pleat panels 122A, 122B that are separated by a fold line 120 that, in this embodiment, is provided by a score line during the manufacturing process.

In tubular filter elements, such as in FIG. 1, the pleat folds 120 (which may be provided by score lines prior to folding) include radially outer pleat folds 120A and radially inner pleat folds 120B (e.g. the radially outer pleat folds 120A would be upstream pleat folds and the radially inner pleat folds 120B would be downstream pleat folds). The pleat panels 122 would generally extend radially (typically at a slight angle from perfectly radially) between the outer and inner pleat folds 120A, 120B. The outer pleat folds 120A can be considered to form a radially outer periphery (illustrated by dashed line 119A) of the tube of filter media while the inner pleat folds 120B form a radially inner periphery (illustrated by dashed line 119B) of the tube of filter media.

In a panel filter element, pleat folds 120A would form an upstream face of the panel filter while pleat folds 120B would form a downstream face of the panel filter element. The pleat panels 122 would extend generally between the upstream and downstream faces.

The filter media also includes a plurality of structural embossments 140A, 140B. Structural embossments 140A are formed in pleat panel 122A while structural embossments 140B are formed in pleat panel 122B.

Figure 3:
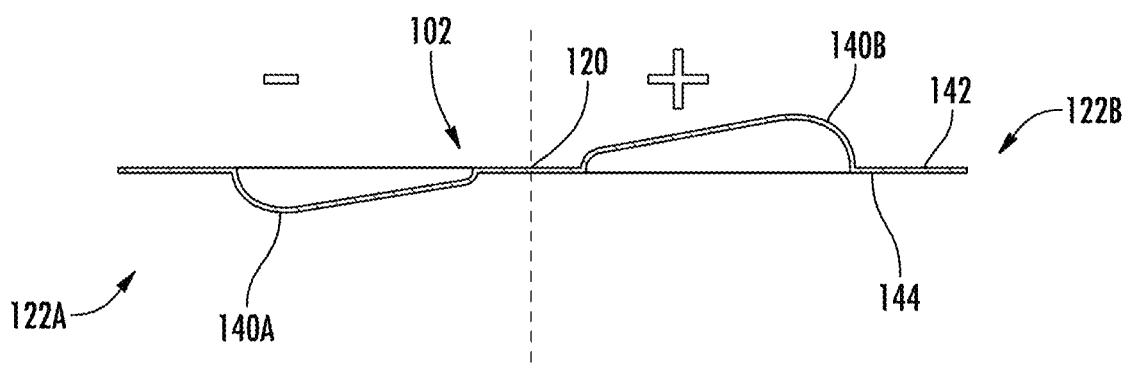
FIG. 3 is a simplified cross-sectional illustration of FIG. 2.

FIG. 2 illustrates an upstream surface 142 (see FIG. 3) of the filter media 102, which is opposite a downstream surface 144. In operation, dirty fluid will first contact upstream surface 142 and then pass through filter media 102 with cleaned fluid exiting the filter media 102 through downstream surface 144.

The filter media has a plurality of manipulations according to embodiments of the application. The first manipulation is the formation of the pleat fold 120, which could be a score or crease.

A second manipulation is the formation of the structural embossments 140A, 140B. In this embodiment, embossments 140A are negative embossments as they form a plurality of depressions in the upstream surface 142 and a plurality of protrusions in the downstream surface 144 of the filter media 102. Embossments 140B are positive embossments as they form a plurality of protrusions in the upstream surface 142 and a plurality of depressions in the downstream surface 144.

Each of the embossments 140 includes a first end 146 and 148. The embossments 140 extend longitudinally between the first and second ends 146, 148 along an embossment axis 150.

In the illustrated embodiment of FIG. 2, the embossments taper between the first and second ends 146, 148. In particular, the width W (illustrated by a double headed arrow in FIG. 2) of the embossments 140 perpendicular to embossment axis 150 increases when moving from the first end 146 toward the second end 148. This results in a tear-dropped shape. In other embodiments, the width can remain constant and need not increase when moving radially inward.

In this embodiment, the second ends 148 of the embossments 140 would be positioned radially closer to the central axis 150 of the tube of filter media 102. In a flat panel filter, the embossments 140 would generally get wider when traveling from an upstream face toward a downstream face of the panel (e.g. in the direction of flow through the filter media panel.

This orientation helps coalesce entrained water as the dirty fluid flows across the upstream face 142 of the filter media 102 and particularly the embossments 140. The embossments also help maintain spacing between the adjacent pleat panels 122A, 122B once folded.

In addition to tapering, in some embodiments, the embossment axis 150 extends at a non-parallel, non-perpendicular orientation relative to the folds 120 and gravity 124. Preferably, the non-parallel, non-perpendicular orientation creates a shingled pattern when viewed in the radial direction, which helps reject more water drop 110 from entering the media.

In a preferred configuration, the orientation of the embossment axis 150 from one embossment 140 to the next embossment 140 changes when transitioning from the top end 132 towards the bottom end 130. In particular, the orientation of vertically lower embossments is steeper relative to the radial direction and closer to parallel to the pleat folds 120 and gravity 124 the closer the corresponding embossment 140 is located relative to bottom end 130.

The increasing steepness when moving toward the bottom increases to blocking effect of the embossments 140. This blocks the water droplets 110 from entering the upstream pleated section of the filter media resulting in overall utilization of the surface area for filtration and better performance of the bottom section of the filter element 100. This is particularly true as the separated water droplets 110 move vertically downward toward the bottom end 130 and sump 114. This helps compensate for the fact that the downward flow of the water results in the bottom portions of the filter element 100 having a high water concentration before the water is collected in sump 114. The increasing angle increases performance of the lower portion of the filter media 102.

In preferred embodiments, the embossments 140A of pleat panel 122A overlap with embossments 140B of pleat panel 122A when viewed perpendicular to the folds 120. As such, the first end of an embossment 140B is positioned vertically between the first ends of two adjacent embossments 140A. However, it is preferred that the first end of an embossment 140A is positioned vertically between the first and second ends 146, 148 of an embossment 140B.

The angle of the embossment axis 150 relative to the flow of fluid through the media 102 (e.g. the generally radial direction) helps prevent the push through of coalesced water droplets by blocking the re-introduction into the media 102 and also uses gravity to assist with water separation.

Adjacent the plurality of embossments 140A, 140B 144, the filter media 102 has a plurality of flat surface regions 160.

Preferably, the structural embossments 140A of one pleat panel 122A are axially offset from the structural embossments 140B of the adjacent pleat panels 122B along the fold 120 such that when the panels 122A, 122B are folded relative to one another about fold 120, the embossments 140B are positioned axially between embossments 140A along fold 120. This allows embossments 140B to cooperate with and/or align with the flat surface regions 160 of the adjacent pleat panel 122A, 122B. This helps maintain appropriate spacing between the pleat panels 122A, 122B.

In a preferred embodiment, these surface regions 160 have been manipulated to have increased surface roughness. More particularly, the filter media 102 is generally formed with a first surface roughness and then the user manipulates the filter media 102, and particularly in these flat surface regions 160 to increase the surface roughness.

In one embodiment, the surface roughness of the upstream surface is at least 116μ, which is equivalent to that of 120 grit sand paper and more preferably at least 190μ, which is equivalent to that of 80 grit sand paper and even more preferably at least 425μ, which is equivalent to 40 grit sand paper.

In one embodiment, the surface regions 160 have, after manipulation, a surface roughness of at least 116μ and more preferably at least 425μ. It should be noted that in some preferred embodiments, the embossments 140 have a height of at least three times greater than the surface roughness.

In some embodiments, the surface roughness of the filter media after being manipulated is increased by at least 50% more preferably by at least 100% and even more preferably by at least 400%.

In some embodiments, the surface roughness of the upstream surface 142 is greater than the surface roughness of downstream surface 144. Typically, but not always, the surface roughness of only the upstream surface 142 is manipulated as this is the surface that is first contacted by the dirty fluid that has the entrained water. The surface roughness helps increase the surface energy of the upstream surface 142 and thus the water separation capabilities thereof.

In FIG. 2, the increased surface roughness is illustrated schematically by dotted stippling on the surface of the filter media 102. This roughness may be referred to as micro roughness.

Figure 4:
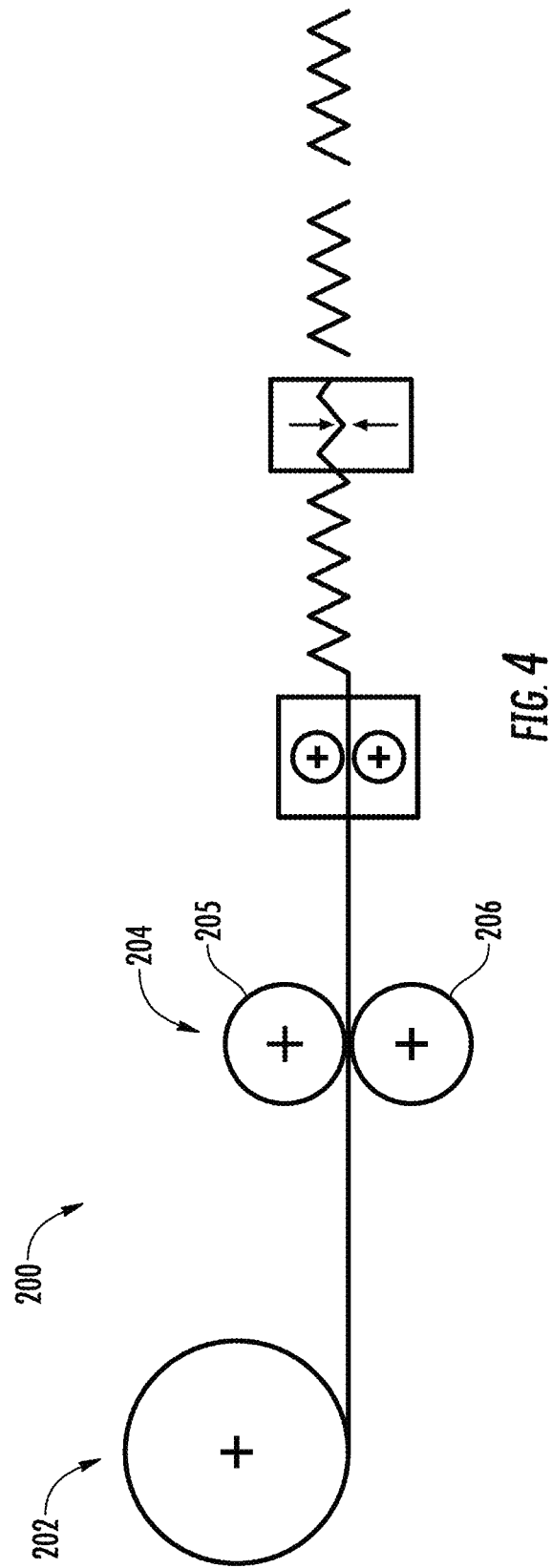
FIG. 4 is a simplified schematic illustration of a system for manipulating the filter media to form a pleated arrangement including structural embossments and increased surface roughness.

FIG. 4 illustrates a simplified filter media processing system 200. The system includes a filter media supply 202, which is typically a roll of filter media that will be used to form filter media 102. The filter media is unwound from the roll and subsequently processed.

Downstream from the filter media supply 202 is a media manipulation station 204 that includes one or more media manipulation tools 205, 206 performs surface manipulation to one or more surfaces and/or regions of the filter media.

In a particular implementation, the media manipulation station 204 include media manipulation tools in the form of opposed compression rollers. In another implementation, the media manipulation tools are provided by a pair of opposed belts. In a further implementation, the media manipulation tools are provided by a pair of linearly actuated stamping plates that move toward and away from one another along an axis that is generally perpendicular to the flow media through the media manipulation station 204.

In one implementation, the media manipulation station 204 only manipulates one side of the filter media, and particularly the side of the filter media that would become upstream surface 142 described above. In such an embodiment, the media manipulation tool 205, 206 that cooperates with that side of the media would manipulate the surface roughness of the corresponding surface of the filter media to increase the surface roughness as compared to an original surface roughness of the filter media.

Preferably, the media manipulation station 204 modifies the surface roughness without removing any or substantially any of the filter media, e.g. by abrading or laser etching of the media. Instead, it is preferred to modify the surface roughness simply by compressing the filter media. Removal methods can, among other things, leave debris on the filter media.

In one implementation, the media manipulation tool 205, 206 that defines the desired surface roughness is formed from a material that is more rigid than the other one of the media manipulation tools 205, 206. In some implementation, the media manipulation tools 205, 206 may have the surface roughness profile laser etched into the surface of the tooling.

In one embodiment, the same media manipulation tool 205 or 206 has both the structural embossment and surface roughness features formed therein.

In some implementations, the media manipulation tool 205, 206 has a rigid member that provides the structural embossment profiles formed therein and a micro-roughness film is attached to the rigid member. The micro-roughness film would surround the structural embossment profiles.

In some implementations, the media manipulation station 204 has a two-step process where the roughness and structural embossments are formed using separate sets of tooling that are aligned sequentially such that one process is performed first and then the other process is performed. Typically, the roughness process would occur first.

In some implementations, structural embossments do not have the surface thereof manipulated to increase roughness and only the remainder portion of the pleat panel (e.g. substantially planar portions of the filter media) are manipulated to provide improved surface roughness.

In a preferred implementation, the media manipulation tools 205, 206 have both a positive and negative structural embossment feature that align to form a single structural embossment. For example, a projection of tool 205 would align with and press filter media into a corresponding recess of cooperating tool 206 to form an embossment. However, while cooperating projection/recess features (e.g. cooperating positive and negative features) may preferably be used to form the structural embossments, the surface roughness features will typically not be formed with such a positive/negative arrangement. Instead, the surface roughness features would be formed simply by one or the other tool 205, 206 without cooperating features between tools 205, 206 that cooperate to form the surface roughness.

In one implementation, the filter media is a laminate of a plurality of layers of filter media. This laminate is formed and the layers thereof are secured to one another prior to passing through the media manipulation station 204.

Further, it is preferred that the surfaces that have had the surface roughness enhanced and increased, it is preferred that these surfaces are not subsequently coated. This is particularly true because the surface roughness added to the filter media is not used as a means for securing separate layers together. Instead, the surface roughness should remain unencumbered by other material such that the improved water separation features remain.

Figure 5:
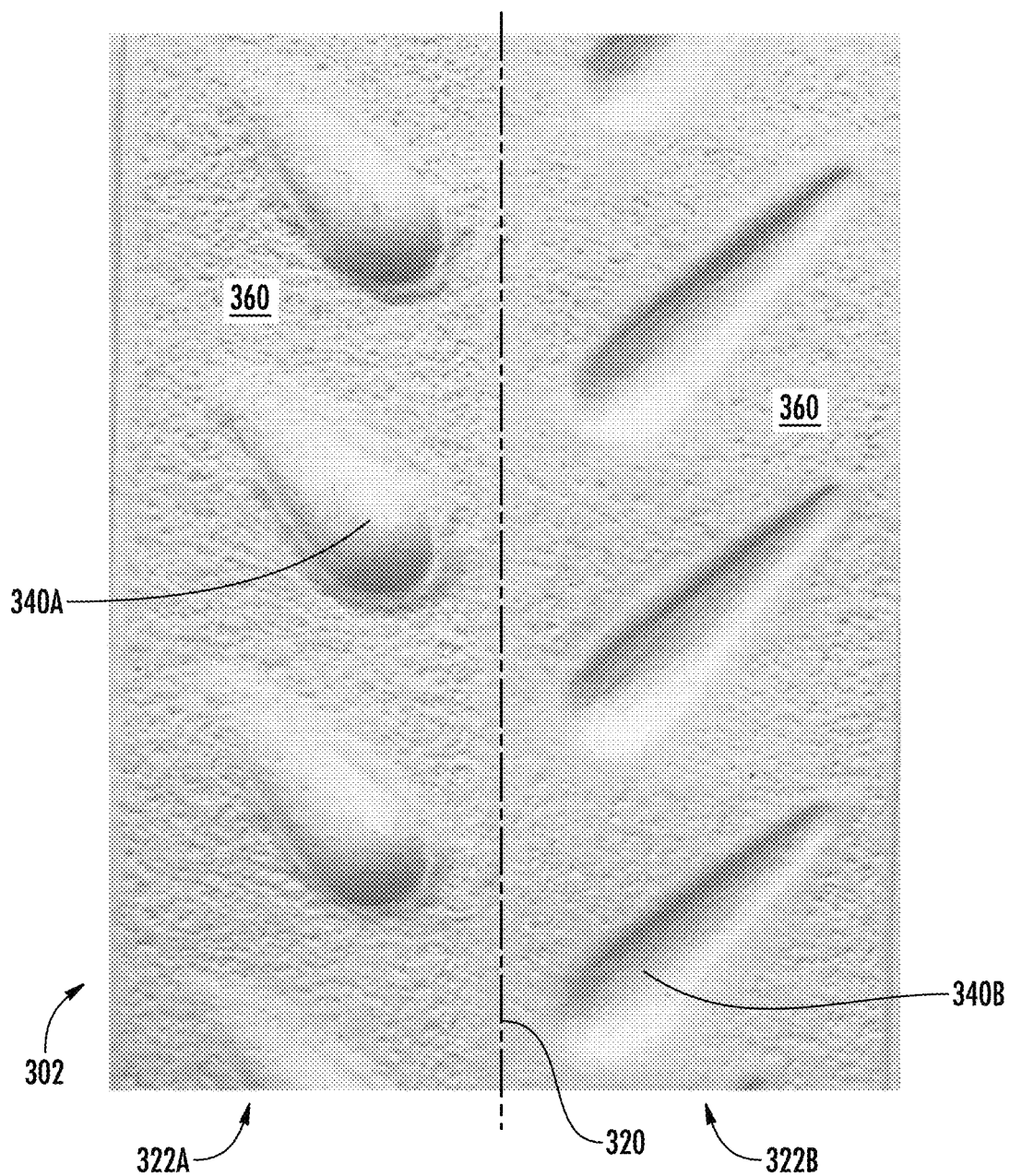
FIG. 5 is a photograph of filter media prior to being pleated according to an implementation of the application including structural embossments and enhanced surface roughness.

FIG. 5 is a photograph of filter media 302 that has been manipulated to include a fold 320 to define pleat panes 322A, 322B, structural embossments 340A, 340B and flat surface regions 360 with enhanced roughness.

Figure 6:
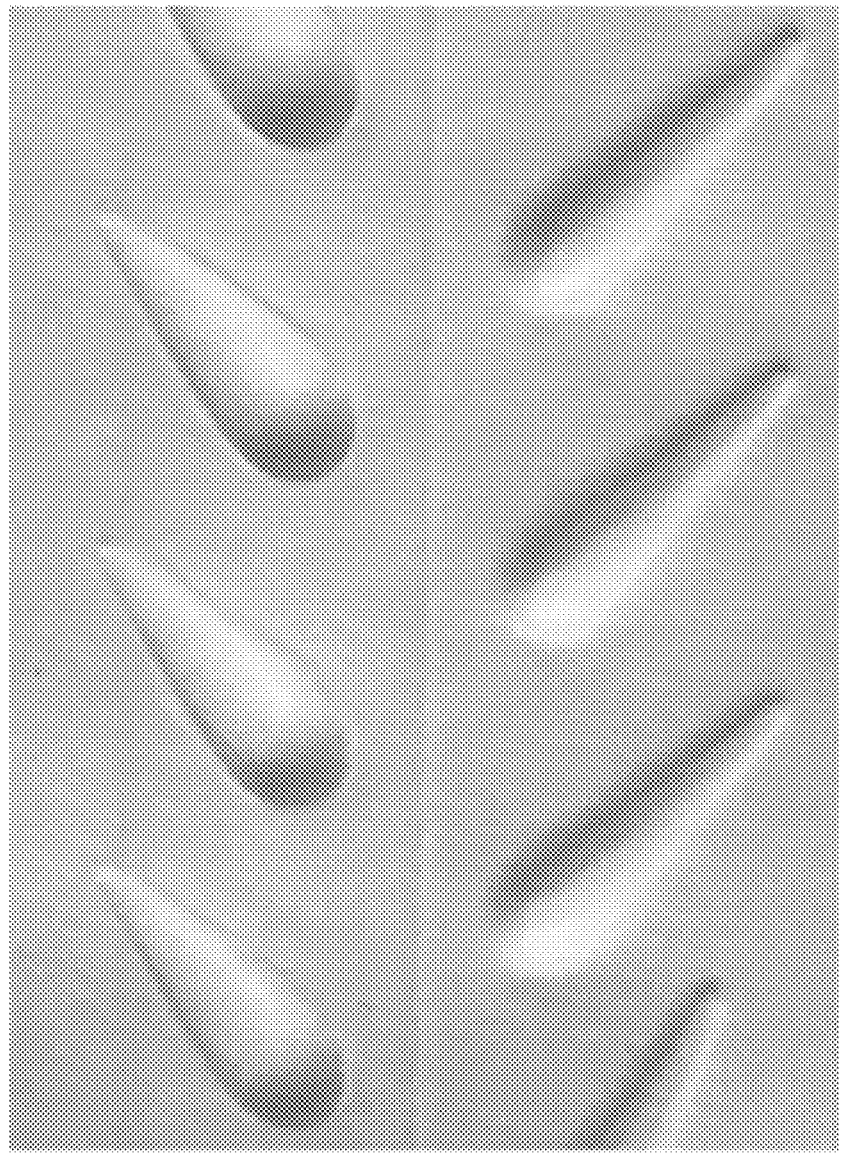
FIG. 6 is a photograph of filter media prior to being pleated according to an implementation of the application including structural embossments.

FIG. 6 is a photograph similar to FIG. 5. However, the filter media did not include the enhanced surface roughness surrounding the structural embossments.

Figure 7:
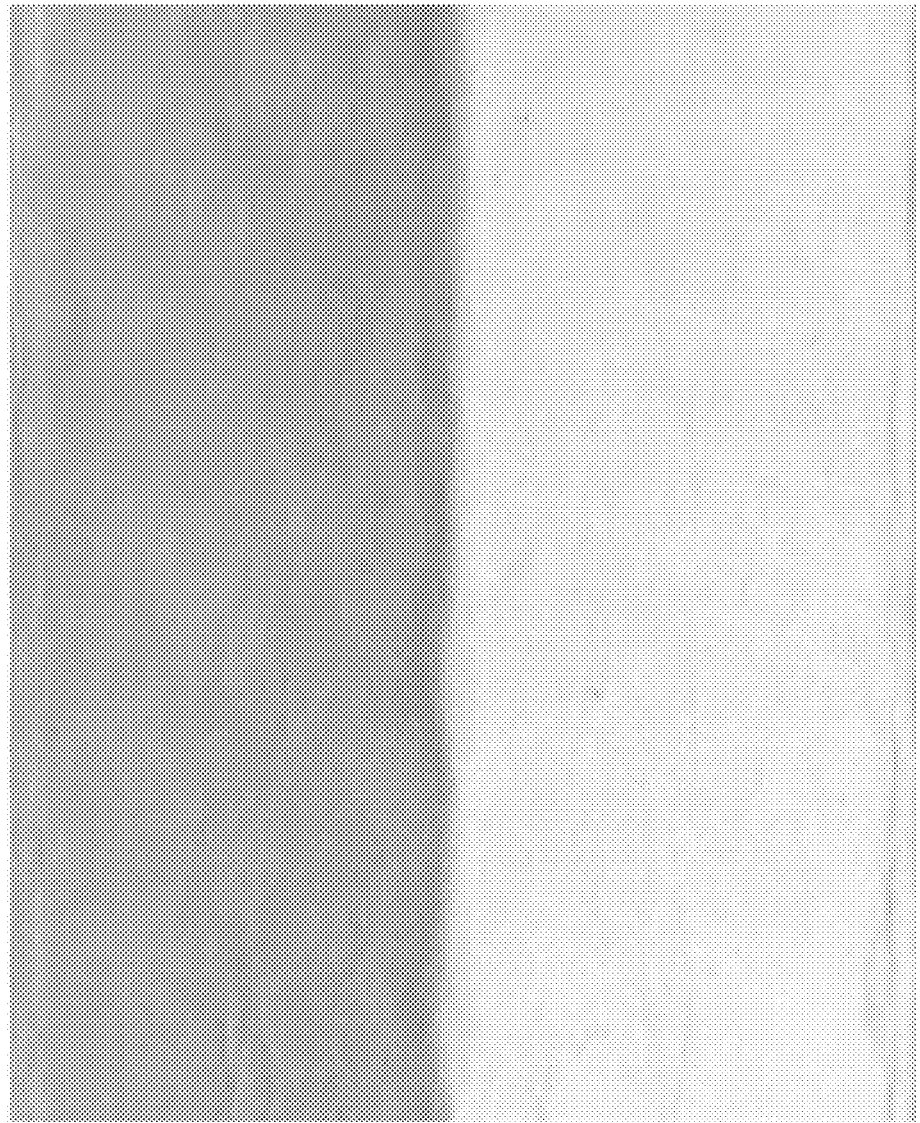
FIG. 7 is a photograph of a control sample of filter media that does not include enhanced surface roughness or embossments that was used for the filter media of FIGS. 5 and 6.

FIG. 7 is a photograph of an unmanipulated sample of the filter media used for the arrangements of FIGS. 5 and 6.

The Applicants have performed various tests to compare the operational parameters of filter media of all three arrangements of FIGS. 5-7. However, not all tests were performed on the sample that did not include surface roughness.

Figure 8:
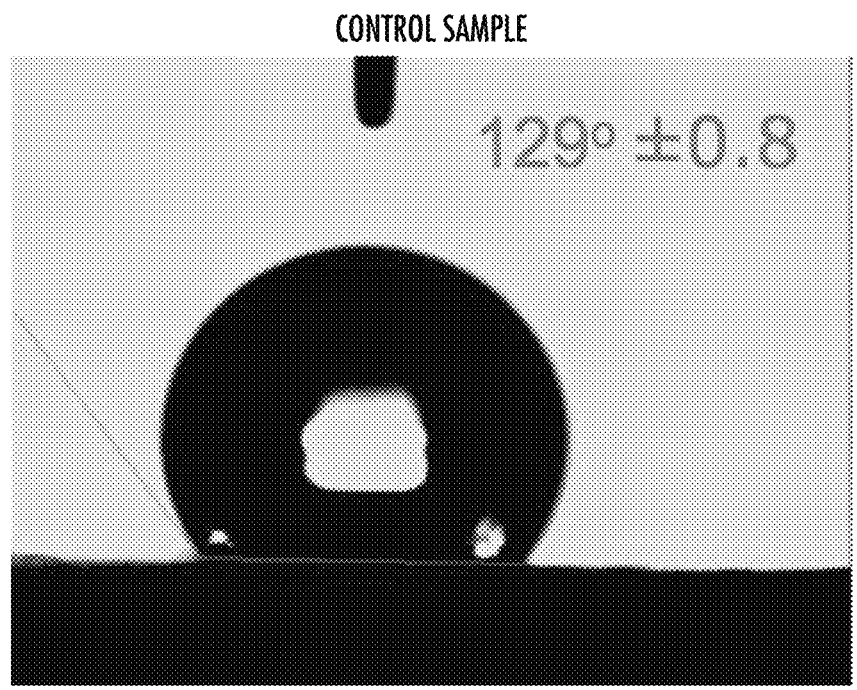
FIG. 8 is an image of the contact angle of a water droplet on the control sample of filter media of FIG. 7.
Figure 9:
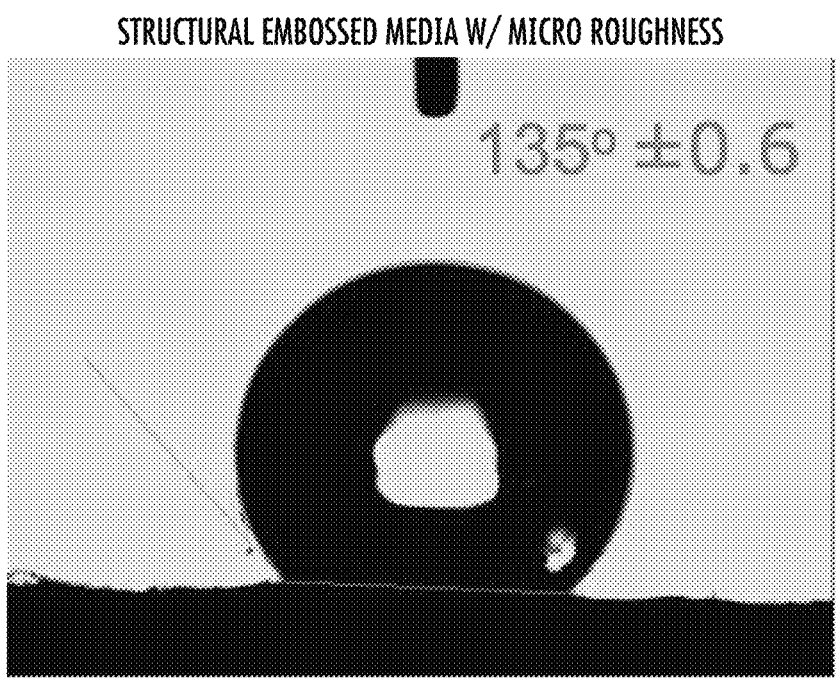
FIG. 9 is an image of the contact angle of a water droplet on the enhanced surface roughness region of the sample of FIG. 5.

FIGS. 8 and 9 compare the contact angle for the control filter media of FIG. 7 and the modified filter media of FIG. 5. The contact angle of water on the surface of the corresponding medias was tested using a Goniometer. It was determined that the sample with the surface roughness increased had a greater contact angle. More particularly, the control sample had an average contact angle of 129° plus or minus 0.8 (average of two values) while the sample with increased surface roughness had an average contact angle of 135° plus or minus 0.6 (average of two values).

Figure 10:
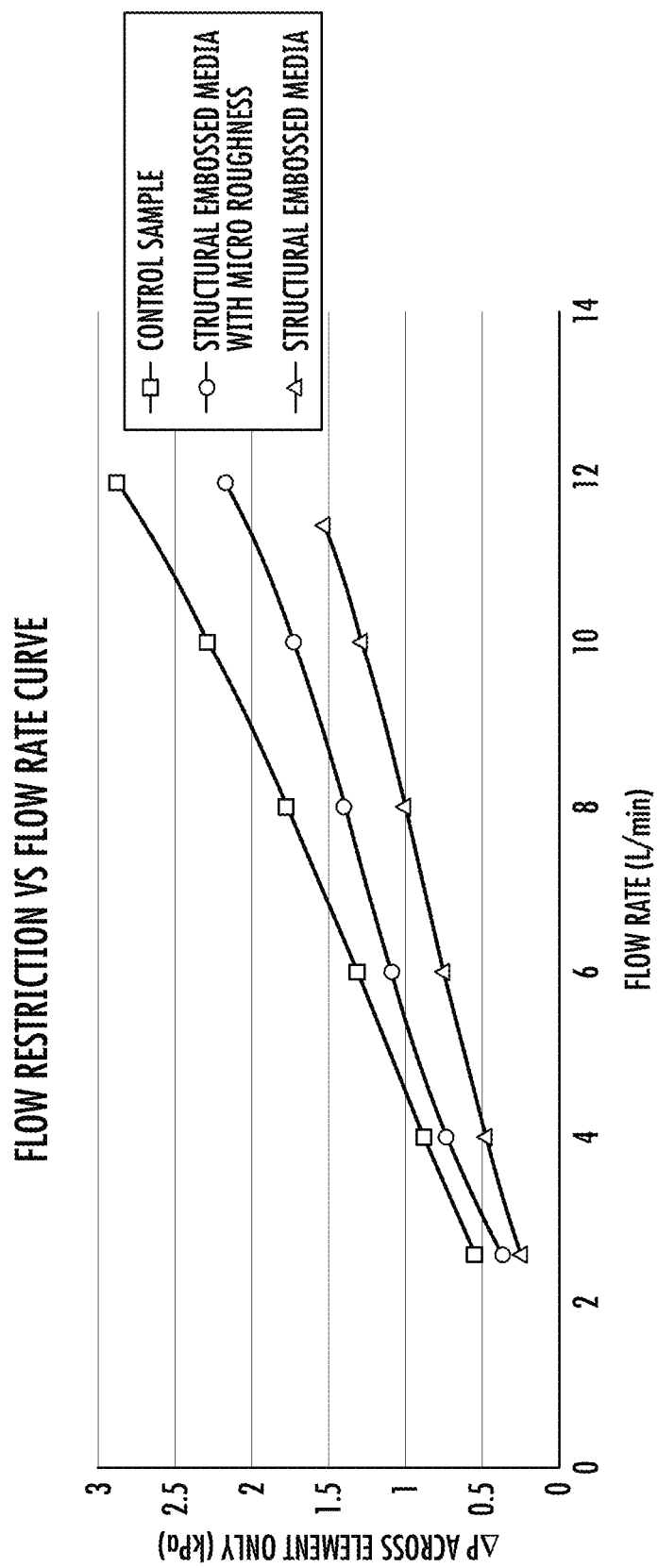
FIGS. 10-12 are test results comparing the samples of FIGS. 5-7.

FIG. 10 illustrates a comparison of the flow restriction vs. flow rate based on SAE J905. The liquid used was ultralow sulfur diesel (ULSD). As illustrated, the modified samples each had reduced pressure drop than the control sample at a same flow rate.

Figure 11:
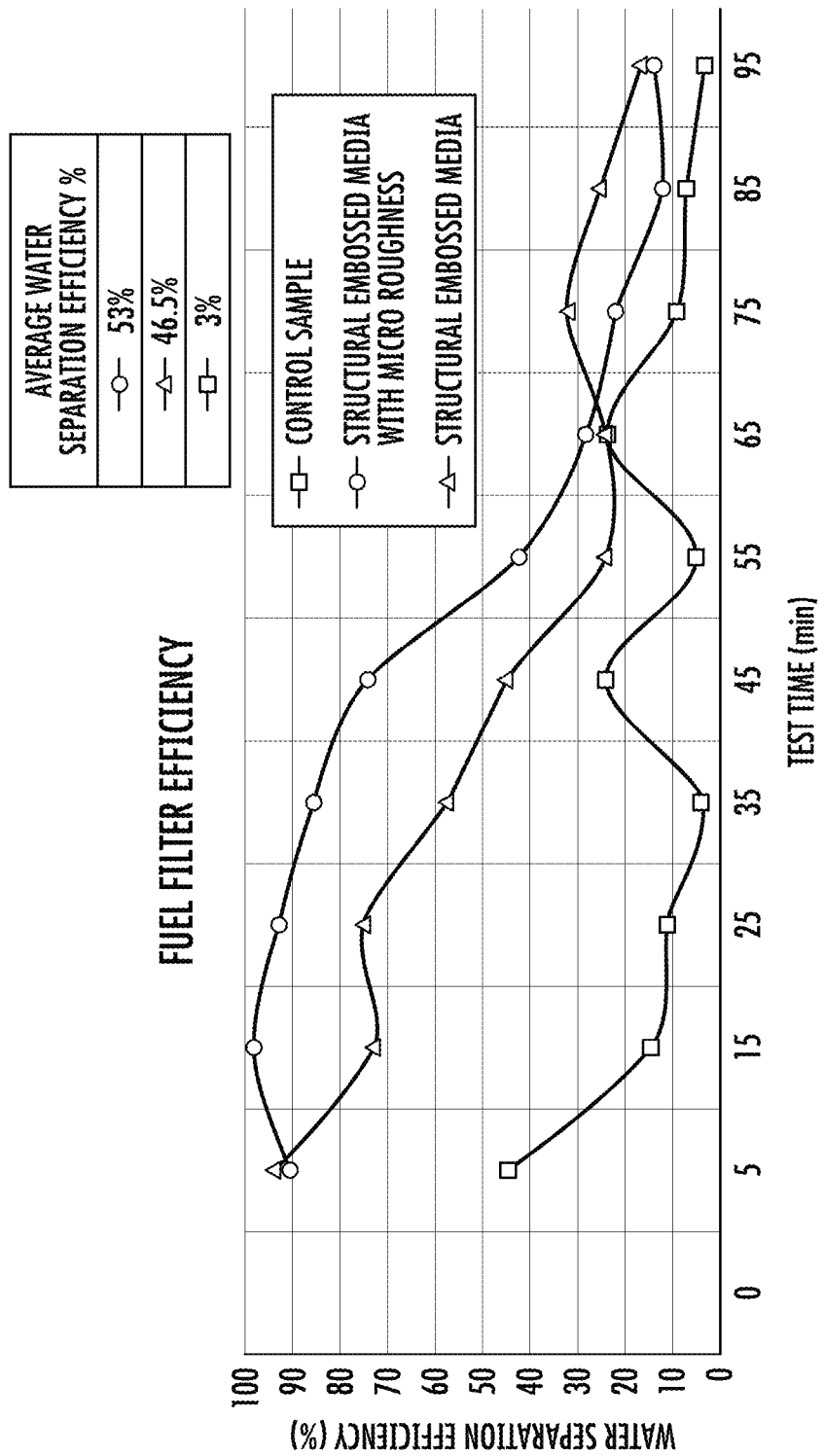

FIG. 11 illustrates a comparison of water separation efficiency over time tested according to SAE J1488. The test flow rate was 1 gpm. The flow was outside-in with a cylindrical filter element.

Figure 12:
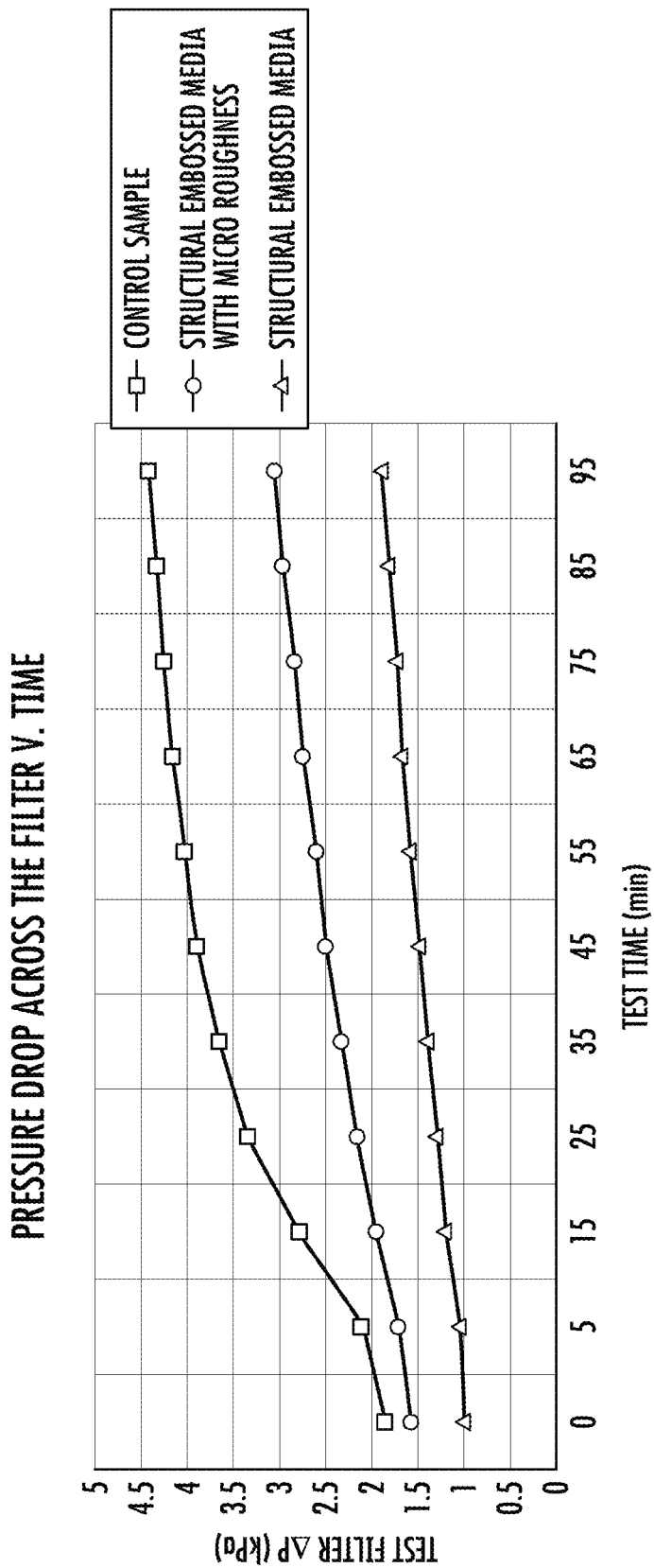

FIG. 12 plots the pressure drop over time for the three samples tested according to SAE J1488. The test flow rate was 1 gpm. The flow was outside-in with a cylindrical filter element.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of processing filter media, comprising the steps of:
    a. providing a layer of filtration media having a surface with a predetermined roughness; and
    b. contacting the surface of the layer of filtration media with a device having a selected roughness, selected from the group consisting of a roller or plate, to impart a greater roughness to a portion of the surface of the layer of filtration media than the predetermined roughness, wherein contacting the surface of the layer of filtration media includes the step of compressing the layer of filtration media with the device.

2. The method as in claim 1, further including the step of pleating the layer of filtration media after the layer of filtration media is contacted with the device.

3. The method as in claim 1, further including the step of forming structural embossments in the surface of the layer of filtration media.

4. The method of claim 3, further including the step of pleating the layer of filtration media to form a plurality of pleat panels with adjacent pleat panels of the plurality of pleat panels having a fold line formed therebetween;
    wherein a plurality of the structural embossments are elongated such that each of the plurality of the structural embossments has a first end and a second end defining an embossment axis extending between the first end and the second end, the embossment axis extending at a non-parallel and non-perpendicular orientation relative to the fold line.

5. The method of claim 4, wherein a first structural embossment and a second structural embossment of the plurality of structural embossments are formed in a first pleat panel of the plurality of pleat panels, the embossment axis of the first structural embossment extending at a different angle than the embossment axis of the second structural embossment.

6. The method of claim 5, wherein, in use, the layer of filtration media has a gravitational top and a gravitational bottom, the gravitational top being vertically above the gravitational bottom, the embossment axis of the first structural embossment being less aligned with gravity than the embossment axis of the second structural embossment.

7. The method of claim 3, wherein the step of contacting the surface of the layer of filtration media with a device having a selected roughness to impart a greater roughness to the portion the surface of the media than the predetermined roughness, occurs on at least 80% of the surface of the layer of filtration media that does not include structural embossments.

8. The method of claim 3, wherein at least 95% of the surface of the layer of filtration media is at least one of compressed to an increased surface roughness, pleated to include fold lines and/or formed to have structural embossments.

9. A method of processing filter media, comprising the steps of:
    a. providing a layer of filtration media having a surface with a predetermined roughness; and
    b. contacting the surface of the layer of filtration media with a device having a selected roughness, selected from the group consisting of a roller or plate, to impart a greater roughness to a portion of the surface of the layer of filtration media than the predetermined roughness;
    forming structural embossments in the surface of the media layer;
    pleating the layer of filtration media to form a plurality of pleat panels with adjacent pleat panels of the plurality of pleat panels having a fold line formed therebetween;
    wherein a plurality of the structural embossments are elongated such that each of the plurality of the structural embossments has a first end and a second end defining an embossment axis extending between the first end and the second end, the embossment axis extending at a non-parallel and non-perpendicular orientation relative to the fold line;

wherein a first structural embossment and a second structural embossment of the plurality of structural embossments are formed in a first pleat panel of the plurality of pleat panels, the embossment axis of the first structural embossment extending at a different angle than the embossment axis of the second structural embossment;

wherein a third structural embossment of the plurality of structural embossments is formed in a second pleat panel of the plurality of pleat panels, the second pleat panel being adjacent to the first pleat panel such that a fold line is formed between the first and second pleat panels, the first end of the third structural embossment being positioned axially between the first ends of the first and second structural embossments along the fold line and the first end of the second structural embossment being positioned axially between the first and second ends of the third structural embossment.

10. The method of claim 9, wherein the plurality of structural embossments each have a width, the width being measured generally perpendicular to the corresponding structural embossment's embossment axis, the width increasing when moving from the first end toward the second end of the corresponding structural embossment.

11. The method of claim 9, wherein:
the first and second structural embossments form a projection on a first side of the layer of filtration media and a depression on the second side of the layer of filtration media;
the third structural embossment forms a projection on the second side of the layer of filtration media and a recess on the first side of the layer of filtration media.

12. A method of processing filter media, comprising the steps of:
 a. providing a layer of filtration media having a surface with a predetermined roughness; and
 b. contacting the surface of the layer of filtration media with a device having a selected roughness, selected from the group consisting of a roller or plate, to impart a greater roughness to a portion of the surface of the media than the predetermined roughness;
wherein the roller or plate has a surface roughness that is at least 116μ.

13. The method of claim 12, wherein the roller or plate has a surface roughness that is at least 190μ.

14. The method of claim 12, wherein the roller or plate has a surface roughness that is at least 425μ.

15. A method of processing filter media, comprising the steps of:
 a. providing a layer of filtration media having a surface with a predetermined roughness; and
 b. contacting the surface of the layer of filtration media with a device having a selected roughness, selected from the group consisting of a roller or plate, to impart a greater roughness to a portion of the surface of the layer of filtration media than the predetermined roughness;
wherein the step of contacting the portion of the surface of the layer of the filtration media with a device having a selected roughness to impart a greater roughness to the portion of the surface of the layer of filtration media than the predetermined roughness is performed by compacting the portion of the surface of the layer of filtration media to form the greater roughness.

16. The method of claim 15, wherein the step of contacting the surface of the layer of filtration media with a device having a selected roughness to impart a greater roughness to the surface of the media than the predetermined roughness is performed without removing material of the layer of filtration media.

17. The method of claim 15, wherein the layer of filtration media is a pre-laminated media formed from a plurality of media layers and the step of contacting the surface of the layer of filtration media with a device having a selected roughness to impart a greater roughness to the portion of the surface of the layer of filtration media than the predetermined roughness does not simultaneously secure the plurality of media layers to form the layer of filtration media.

18. The method of claim 15, wherein the surface is not subsequently coated or covered after the step of contacting the portion of the surface of the layer of filtration media with a device having a selected roughness to impart a greater roughness to the portion of the surface of the layer of filtration media than the predetermined roughness.

19. The method of claim 15, wherein the step of contacting the surface of the layer of filtration media with a device having a selected roughness to impart a greater roughness to the portion of the surface of the layer of filtration media than the predetermined roughness increases the surface roughness of the surface by at least 50%.

20. The method of claim 15, wherein the step of contacting the surface of the layer of filtration media with a device having a selected roughness to impart a greater roughness to the portion of the surface of the layer of filtration media than the predetermined roughness increases the surface roughness of the surface by at least 100%.

21. The method of claim 15 wherein the step of contacting the surface of the layer of filtration media with a device having a selected roughness to impart a greater roughness to the portion of the surface of the layer of filtration media than the predetermined roughness increases the surface roughness of the surface by at least 400%.

22. A method of processing filter media, comprising the steps of:
 a. providing a layer of filtration media having a surface with a predetermined roughness; and
 b. contacting the surface of the layer of filtration media with a device having a selected roughness, selected from the group consisting of a roller or plate, to impart a greater roughness to a portion of the surface of the layer of filtration media than the predetermined roughness;
wherein the step of contacting the surface of the layer of filtration media with a device causes the surface roughness of the portion of the surface of the layer of filtration media to have a contact angle that is measured using a goniometer with water of between 130 degrees and 140 degrees.

23. The method of claim 22, wherein the step of contacting the surface of the layer of filtration media with a device causes the surface roughness of the portion of the surface of the layer of filtration media to have a contact angle that is measured using a goniometer with water of at least 132.

24. A filter element comprising:
 a pleated filter media pack formed from a layer of filtration media, the layer of filtration media forming a plurality of pleat panels formed by a plurality of fold lines, the layer of filtration media having an upstream surface and a downstream surface;
 a portion of the upstream surface being compressed to have a desired surface roughness;
wherein the layer of filtration media includes structural embossments in the upstream surface of the layer of filtration media;

wherein a plurality of the structural embossments are elongated such that each of the plurality of the structural embossments has a first end and a second end defining an embossment axis extending between the first end and the second end, the embossment axis extending at a non-parallel and non-perpendicular orientation relative to the fold lines;

wherein a first structural embossment and a second structural embossment of the plurality of structural embossments are formed in a first pleat panel of the plurality of pleat panels, the embossment axis of the first structural embossment extending at a different angle than the embossment axis of the second structural embossment; and wherein a third structural embossment of the plurality of structural embossments is formed in a second pleat panel of the plurality of pleat panels, a first fold line of the plurality of fold lines that is formed between the first and second pleat panels, the first end of the third structural embossment being positioned axially between the first ends of the first and second structural embossments along the first fold line and the first end of the second structural embossment being positioned axially between the first and second ends of the third structural embossment.

25. The filter element of claim 24, wherein the plurality of structural embossments each have a width, the width being measured generally perpendicular to the embossment axis of the corresponding structural embossment, the width increasing when moving from the first end toward the second end of the corresponding structural embossment.

26. The filter element of claim 24, wherein:
the first and second structural embossments form a projection on a first side of the layer of filtration media and a depression on a second side of the layer of filtration media;
the third structural embossment forms a projection on the second side of the layer of filtration media and a recess on the first side of the layer of filtration media.

27. A filter element comprising:
a pleated filter media pack formed from a layer of filtration media, the layer of filtration media forming a plurality of pleat panels formed by a plurality of fold lines, the layer of filtration media having an upstream surface and a downstream surface;
a portion of the upstream surface being compressed to have a desired surface roughness; and
wherein the surface roughness of the portion of the upstream surface is at least 116μ.

28. The filter element of claim 27, wherein the surface roughness of the portion of the upstream surface is greater than the surface roughness of the downstream surface.

29. The filter element of claim 28, wherein the upstream surface of the layer of filtration media is exposed such that fluid to be filtered first contacts the upstream surface of the layer of filtration media.

30. The filter element of claim 27, wherein the layer of filtration media includes structural embossments in the upstream surface of the layer of filtration media.

31. The filter element of claim 30, wherein a plurality of the structural embossments are elongated such that each of the plurality of the structural embossments has a first end and a second end defining an embossment axis extending between the first end and the second end, the embossment axis extending at a non-parallel and non-perpendicular orientation relative to the fold lines.

32. The filter element of claim 31, wherein a first structural embossment and a second structural embossment of the plurality of structural embossments are formed in a first pleat panel of the plurality of pleat panels, the embossment axis of the first structural embossment extending at a different angle than the embossment axis of the second structural embossment.

33. The filter element of claim 32, wherein the filter element has a gravitational top and a gravitational bottom, the gravitational top being vertically above the gravitational bottom, the embossment axis of the first structural embossment being less aligned with gravity than the embossment axis of the second structural embossment.

34. The filter element of claim 30, wherein at least 80% of the upstream surface of the layer of filtration media that does not include structural embossments has a surface roughness that is greater than the surface roughness of the structural embossments.

35. The filter element of claim 30 wherein at least 95% of the surface of the layer of filtration media has been manipulated to include at least one of an increased surface roughness, a fold line and/or a structural embossment.

36. The filter element of claim 27, wherein the surface roughness of the portion of the upstream surface of the layer of filtration media has been provided by compressing the upstream surface of the layer of filtration media and not by removal of material of the upstream surface.

37. The filter element of claim 27, wherein the upstream surface of the layer of filtration media is an exposed surface and any voids in the portion of the upstream surface of the layer of filtration media are not filled with or covered by other material.

38. The filter element of claim 27, wherein the layer of filtration media is a pre-laminated media formed from a plurality of media layers secured to one another independent of any structures formed into the layer of filtration media providing the surface roughness of the upstream surface.

39. The filter element of claim 27, wherein the surface roughness of the portion of the upstream surface has been compressed to be at least 50% greater than in an uncompressed state.

40. The filter element of claim 27, wherein the surface roughness of the portion of the upstream surface is at least 190μ.

41. The filter element of claim 27, wherein the surface roughness of the portion of the upstream surface is at least 425μ.

42. A filter element comprising:
a pleated filter media pack formed from a layer of filtration media, the layer of filtration media forming a plurality of pleat panels formed by a plurality of fold lines, the layer of filtration media having an upstream surface and a downstream surface;
a portion of the upstream surface being compressed to have a desired surface roughness:
wherein the surface roughness of the layer of filtration media has a contact angle that is measured using a goniometer with water of between 130 degrees and 140 degrees.

43. The filter element of claim 41, wherein the surface roughness of the layer of filtration media has a contact angle with water of at least 132 degrees that is measurable using a goniometer.

* * * * *